United States Patent [19]
Rudolph

[11] Patent Number: 5,331,114
[45] Date of Patent: Jul. 19, 1994

[54] METHOD AND APPARATUS TO PRESSURE SEAL CABLE SPLICES

[75] Inventor: Howard W. Rudolph, 321 Boone Rd., Birdsboro, Pa. 19508

[73] Assignee: Howard W. Rudolph, Birdsboro, Pa.

[21] Appl. No.: 778,027

[22] Filed: Oct. 17, 1991

[51] Int. Cl.$^5$ ................ H02G 15/113; H02G 15/04
[52] U.S. Cl. ........................................ 174/93; 174/76; 174/77 R; 174/92
[58] Field of Search ............... 174/92, 93, 77 R, 76; 156/49; 29/868, 869

[56] References Cited

U.S. PATENT DOCUMENTS

| | | | |
|---|---|---|---|
| 3,254,153 | 5/1966 | Kohler | 174/93 |
| 3,337,681 | 8/1967 | Smith | 174/92 |
| 3,624,594 | 11/1971 | Trimble et al. | 439/523 |
| 4,079,193 | 3/1978 | Channell | 174/77 R X |
| 4,087,190 | 5/1978 | Haeder | 174/92 X |
| 4,442,155 | 4/1984 | Foertsch et al. | 174/92 X |
| 4,647,719 | 3/1987 | Campbell et al. | 174/93 |
| 4,733,019 | 3/1988 | Pichler et al. | 174/92 |
| 4,839,472 | 6/1989 | Pichler | 174/92 |

FOREIGN PATENT DOCUMENTS

| | | | |
|---|---|---|---|
| 2343764 | 3/1975 | Fed. Rep. of Germany | 174/92 |
| 2401552 | 7/1975 | Fed. Rep. of Germany | 174/93 |
| 3442326 | 5/1986 | Fed. Rep. of Germany | 174/93 |
| 7508247 | 1/1976 | Netherlands | 174/92 |
| 2162000 | 1/1986 | United Kingdom | 174/93 |

*Primary Examiner*—Norris H. Nimmo

[57] ABSTRACT

An apparatus and method to pressure seal cable splices utilizing a forced encapsulant, the apparatus comprising a sleeve having an interior and exterior surface, a first end, a second end and a longitudinal slit having a longitudinal edge along each side thereof. The slit can be widened and thereby alter the diameter of the sleeve. A pair of locking flanges are secured to the exterior surface which extend longitudinally adjacent each side of the longitudinal edge and which may be cammed together to close the longitudinal slit. An inner flange is located along one longitudinal edge of the longitudinal slit which extends peripherally and is adjacent the inner surface of the sleeve when the pair of locking flanges are releasably secured together. An end cap is located at each of the sleeve ends and each has at least one opening therein to permit the passage of a cable therethrough. The apparatus includes camming brackets to secure the locking flanges adjacent one another. Additionally, the apparatus may include an end cap pressure indicator dome which indicates the splice has been properly sealed by the encapsulant which is inserted into the sleeve prior to closing the sleeve.

12 Claims, 5 Drawing Sheets

METHOD AND APPARATUS TO PRESSURE SEAL CABLE SPLICES

BACKGROUND OF THE INVENTION

Underground installations of cables for telephone, electrical and other services is common. Installing such cables includes the laying of the cable in a trench or conduit from the source and then making the necessary connections, junctions, etc. to provide the service to individual homes and/or structures. Oftentimes, such installations require the splicing of cables having an exterior protective sheathing of a resilient material such as a plastic, about an aluminum inner sheathing, having contained therein, one or a plurality of individual lengths of wire. Typically, cables utilized in providing telephone services may carry 50, 100, 200 and even up to 600 or more, inner lines or wires within the outer protective sheathing.

Once the outer protective sheathing is broken, for example, when one or more of the inner wires is spliced, the opening in the protective sheathing subjects the inner wires to potential damage from water, moisture, or other elements. Although prior attempts have been made to seal splices in underground wires, these methods have not achieved the desired results.

There has therefore been a long felt need for a method and apparatus to effectively seal cable splices used in telecommunications and other wiring systems.

OBJECTS OF THE INVENTION

Accordingly, it is a general object of this invention to provide a new and improved method and apparatus to seal cable splices which overcomes the disadvantages of the prior art.

It is another object of this invention to provide a method and apparatus to seal cable splices using internal pressure to force an encapsulant throughout the splice and up into the cable and wire openings.

It is a further object of this invention to provide a method and apparatus to seal cable splices which is easy to utilize and makes the splice essentially impervious to the elements such as water.

It is another object of this invention to provide a method to seal cable splices which utilizes a pressurized encapsulant to ensure that the encapsulant is forced throughout cable splice and is effectively sealed.

It is another object of this invention to provide a method and apparatus to seal cable splices which permits the cable splice, once sealed, to be subsequently accessed with a minimum of effort.

It is yet another object of this invention to provide a method and apparatus to seal cable splices which provides a visual indication that the cable splice has been effectively sealed.

SUMMARY OF THE INVENTION

These and other objects of this invention are achieved by providing an apparatus for sealing cable splices which comprises a sleeve having an interior and exterior surface, a first end, a second end and a longitudinal slit having a longitudinal edge along both sides thereof. The slit can be widened to alter the diameter of the sleeve. A pair of locking flanges are secured to the exterior surface which extend longitudinally adjacent each side of the longitudinal edge and which may be cammed together to close the longitudinal slit. An inner flange is located along one longitudinal edge of the longitudinal slit which extends peripherally and is adjacent the inner surface of the sleeve when the pair of locking flanges are releasably secured together. An end cap is located at each of the sleeve ends and each has at least one opening therein to permit the passage of a cable therethrough. The apparatus also includes camming brackets to secure the locking flanges adjacent one another. Additionally, the apparatus may include an end cap pressure indicator dome which indicates the splice has been properly sealed by the encapsulant which is inserted into the sleeve prior to closing the sleeve.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENT

Figure 1:
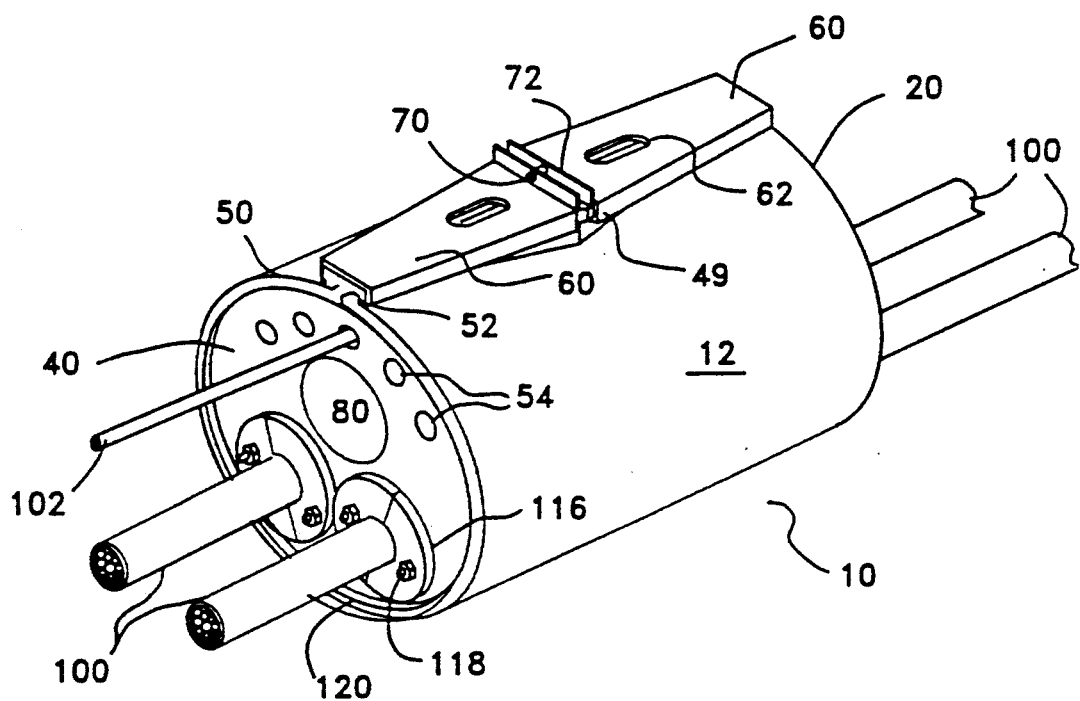
FIG. 1 is a perspective view of the cable splicing apparatus of the present invention.

Referring now to various FIGURES of the drawing where like reference numerals refer to like parts, there is shown at 10 in FIG. 1, an apparatus constructed in accordance with this invention.

Figure 2:
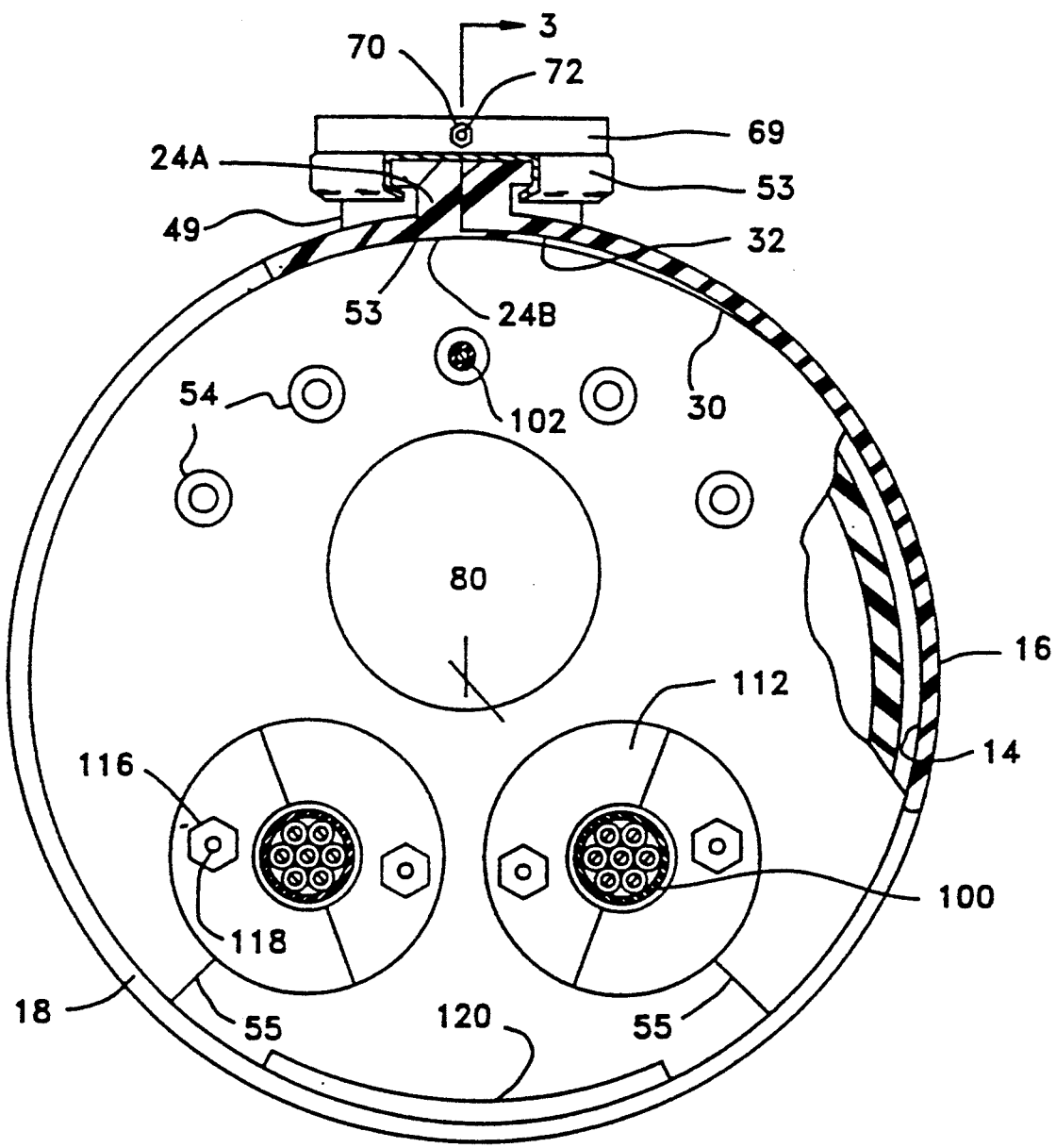
FIG. 2 is an enlarged elevational end view, partially in section of the cable splicing apparatus of the present invention.
Figure 5:
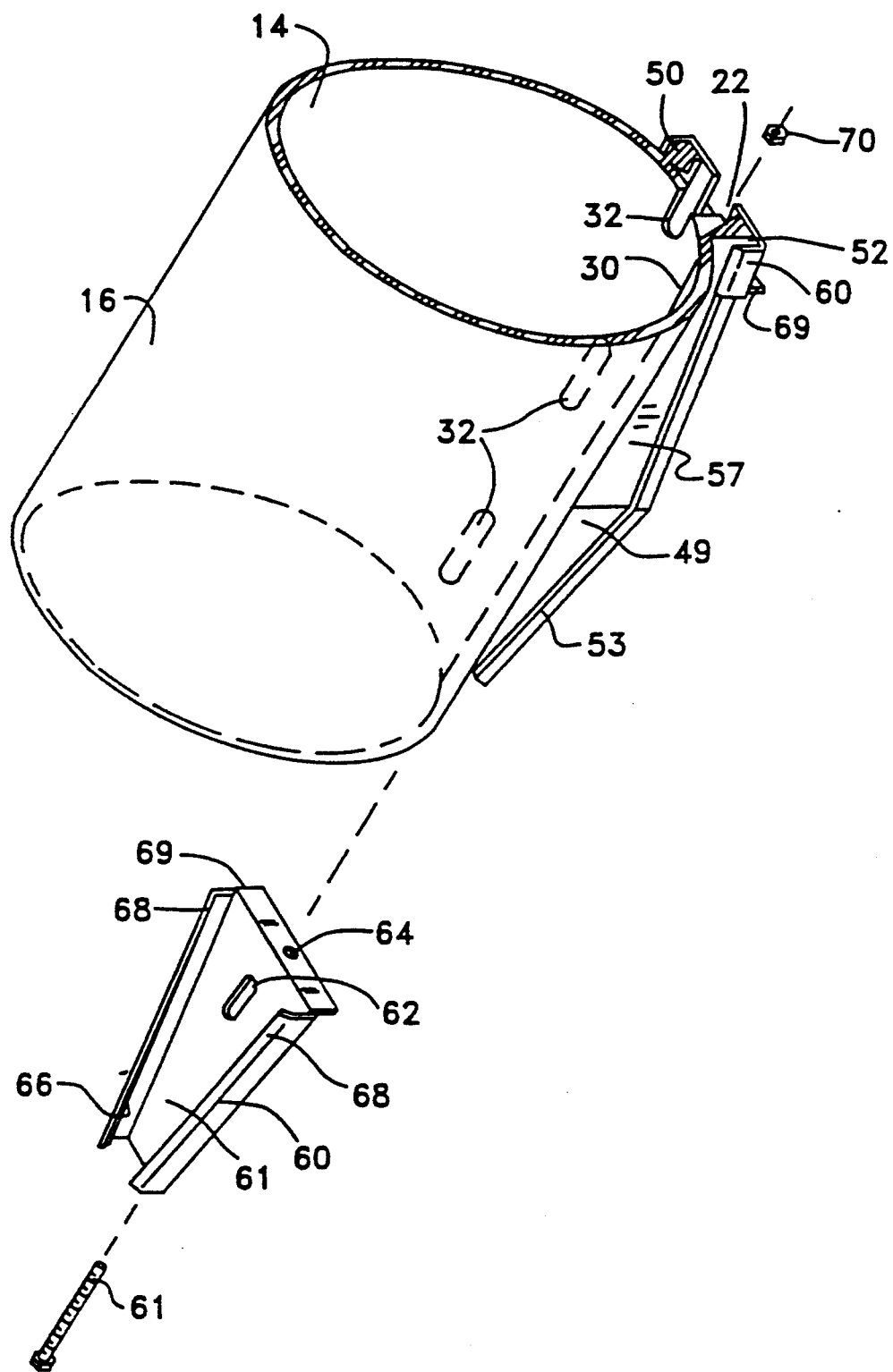
FIG. 5 is an exploded perspective view, partially in section, partially in phantom, of the sleeve and camming brackets of the present invention.

As seen in FIGS. 1, 2 and 5, the apparatus 10 for sealing cable splices includes a sleeve 12 having an interior surface 14, an exterior surface 16, a first end 18, a second end 20 and a longitudinally extending slit 22. The slit 22 is widened to increase the diameter of the sleeve to fit the cable splice therein and is then decreased to close and eventually seal the cable splice by compressing an encapsulant inserted therein (not shown), as will be described in further detail below.

Figure 3:
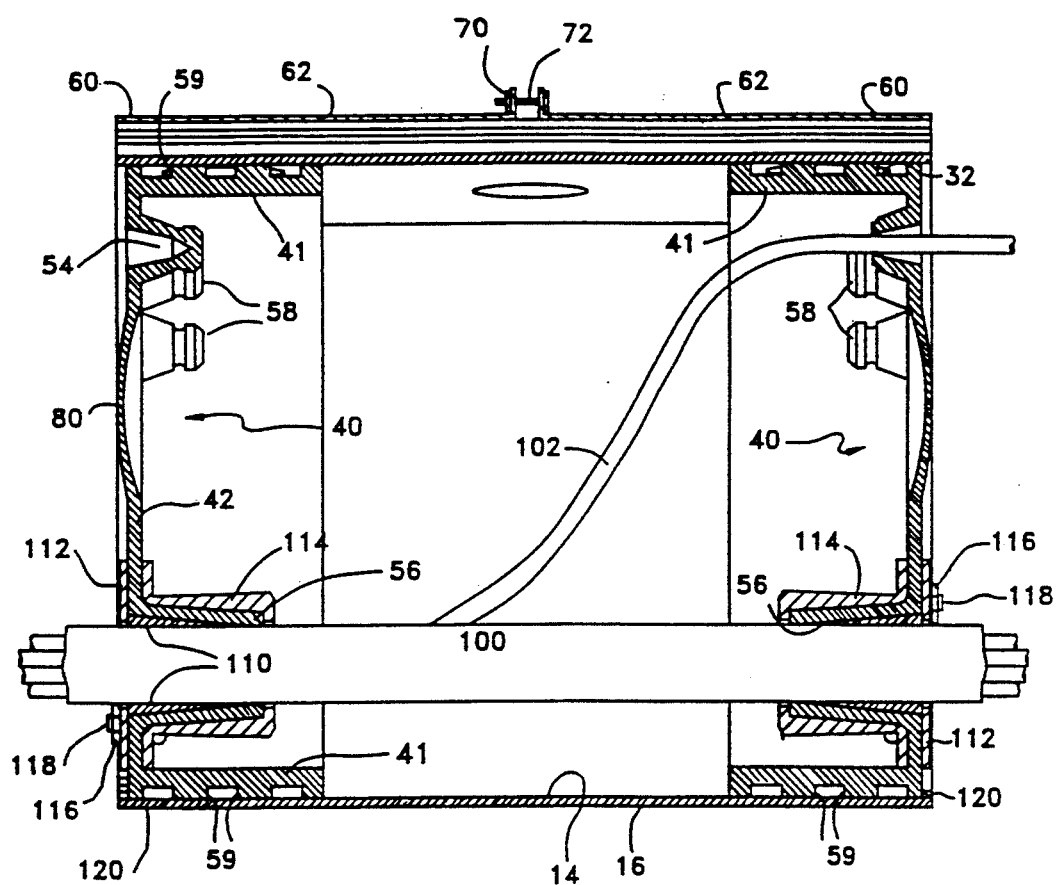
FIG. 3 is a sectional view of the cable splicing apparatus of the present invention, taken along lines 3—3 of FIG. 2.
Figure 4:
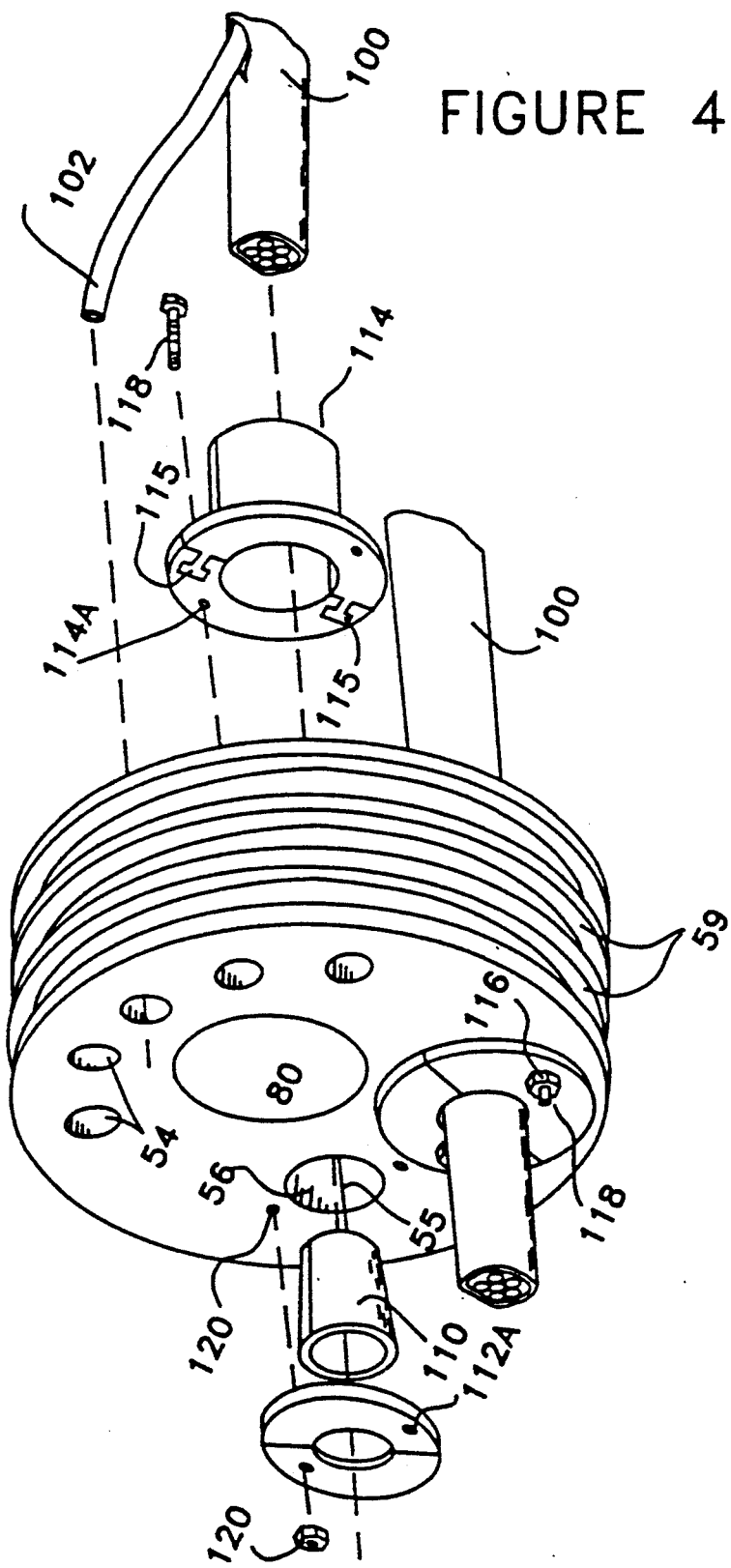
FIG. 4 is an enlarged exploded perspective view of the end cap and its components when used with a cable splice.

End caps 40 (also known as a combination seal) are included at each of the sleeve ends as shown in FIGS. 3 and 4. A cable 100 and any wire 102 spliced therefrom pass through the end caps into the sleeve; the cable 100 passing through a sealable cable hole 56 and the spliced wire 102 passing through a self-sealing port hole 54.

To assemble the apparatus, the cable splice is positioned within the sleeve 12, the end caps are positioned and the sleeve is closed by camming the generally v-shaped camming brackets 60 together, as shown in FIG. 5, until each of the holes 62 in the camming brackets 60 is aligned over one of the end holes 32 in the inner flange of the sleeve, to permit the insertion of an encapsulant therein (not shown). After the desired amount of encapsulant is inserted, and air is allowed to escape, the camming brackets 60 are brought towards one another and secured together by inserting a conventional threaded nut 70 and bolt 72 assembly or other conventional securement means through the holes 64 in the vertical flanges 69 of the brackets 60.

As shown in FIGS. 1 and 5, the flanges 50 and 52 (also called locking flanges) extend radially outwardly and are integrally secured to the exterior surface 16 of the sleeve 12 at the longitudinally extending edges thereof. The inner surfaces of the flanges 24A and 24B, face each other to form the longitudinal edges 24 of the slit and are releasably secured to abut one another when the sleeve is in the closed position.

The flanges 50 and 52 are cammed together by the wedge bracket to close the longitudinal slit. The flanges 50 and 52, are male and female fittings, respectively, which, by their complementary structural features, facilitate the securement and alignment of the closure of the sleeve 12 as described below.

As seen in FIG. 2, the inner flange 30 is located along one longitudinal edge of the longitudinal slit which extends peripherally and is adjacent the inner surface 14 of the sleeve 12 when the flanges 50 and 52 are held together. When flanges 50 and 52 are closely spaced, the inner flange 30 bridges the slit 22. As seen in FIG. 5, the inner flange 30 has a number of holes 32 therethrough, preferably three, to insert the sealing encapsulant (not shown) into the sleeve to seal the splice, as is described hereinafter.

The diameter and length of the sleeve are sized in accordance with the requirements of its use. For example, a sleeve having a 4 inch diameter may be utilized with 50, 100 or 200 pair cables; a 6 inch diameter sleeve being utilized with a 200, 300, 400 or 600 pair cables; and an 8 inch diameter sleeve being utilized with a 600 or more pair cables. In addition, the sleeve may be comprised of almost any desirable non-degradable material. All of the components of this invention are made of metal or a plastic, preferably conventional PVC or ABS plastic.

The details of the end caps 40 are shown in FIGS. 2 and 4, it shall be understood that the construction of each end cap in the embodiment shown is identical, although the number of holes utilized on each end cap may vary depending upon the type of connection being made.

Each end cap 40 basically comprises a circular end wall 42 and an integral cylindrical flange 41, comprised of a resilient material, e.g., polyethylene, KRYLON rubber. The end wall 42 has a plurality of sealed port holes 54 and at least one sealable cable hole 56 therethrough, an internal pressure indicator dome 80 and a plurality of ridges 59 which frictionally aid, especially when compressed, in securing the end caps to the sleeve, and permit the reduction of the circumference of the sleeve. It should be readily apparent to those skilled in the art that the number, size and location of the holes and/or ports can be varied depending upon the circumstances of use and that the number disclosed are not intended to be a limitation thereof.

The cylindrical flange 41 forms a circular wall having a plurality of annular integral ridges 59 on the outer periphery of the flange 41. The flange 41 is of substantially the same diameter as the end wall 42 and fits within the end of the sleeve 12.

As best seen in FIG. 3, the port holes 54 are formed as inwardly extending nipples which are originally closed until the desired number of port holes is needed. When it is desired to introduce a wire through the port hole 54, the end of the nipple is cut or snipped off, utilizing a conventional knife or snip tool (not shown).

The cable 102 or other wire is then passed therethrough. In the preferred embodiment shown in FIG. 3, the port hole 54 is tapered from the exterior of the end cap to the interior thereof to self-seal the wire into the end cap and prevent the entry of moisture or other contaminants into the sleeve once closed and sealed.

In addition, the cable holes 56 are also preferably sealed to prevent the entry of moisture and other contaminants. To that end, as best seen in FIG. 4, the two cable hole embodiment includes cable holes 56 which have a slit 55 extending from the exterior of the central core to the hole, to facilitate the placement of the cable 100 into the cable hole 56 by widening of the slit 55 and inserting the cable therethrough. As seen in FIGS. 3 and 4, once the cable is inserted into the cable hole 56, a split grommet 110 made of a resilient material such as PVC plastic or rubber, is placed about the cable on the exterior side of the end cap. The cable with the grommet 110 is then pulled into the opening 56 to provide a seal about the wire and the end cap 40. Thereafter, a conventional split washer 112 is inserted about the cable adjacent the exterior of the end cap 40, and a compression seal 114, described below, is inserted about the cable 102 on the interior of the end cap. The washer 112 is secured to the end cap 40 by a threaded nut 116 and bolt 118 arrangement. The threaded bolt 118 is inserted, through the compression seal holes 114A, the end cap holes 120 and the washer holes 112A and then secured by nuts 116.

As shown in FIG. 4, the tapered compression seal 114 is comprised of a rigid material such as PVC or ABS plastic, etc. and the halves of the seal 114 are preferably secured together by the presence of T-shaped "locking" protrusions 115 which slidingly engage the complementary T-shaped openings in the mating half of the seal 114. Various sized tapered seals 114 and grommets 110 may be utilized depending upon the size of the cable passing therethrough.

As seen in FIG. 3, a similar securement of the cable 100 and any other wiring connections through the second end cap may then be accomplished. Once the wiring connections are made, both end caps 40 are placed within the sleeve. In the preferred embodiment, the sleeve 12 additionally comprises an end cap retaining lip 120 which is integrally formed and protrudes inwardly radially from the interior surface of the sleeve at each end thereof, to which the end cap may abut for additional securement. It should be readily apparent to those skilled in the art that the retaining lip 120 may also comprise a lip which extends intermittently around the circumference of the interior of the sleeve.

Additionally, as shown in FIGS. 1-4, the apparatus 10, preferably includes an integrally formed end cap pressure indicator dome 80 which indicates the splice has been properly sealed by the encapsulant which is inserted into the sleeve prior to closing the sleeve. Proper internal pressure is indicated when the dome moves from an initially concave position with respect to the outer surface 81 of end wall 42 to the convex position shown in FIG. 3. The dome 80 is integrally formed with the end cap and is therefore comprised of the same resilient material as the end cap. In the preferred embodiment, the dome protrudes to the convex position when the pressure inside the sleeve containing the encapsulant is in the range of 12-15 pounds per square inch (psi). Where the circumstances of use require, the pressure range may be 10-20 psi or more.

The details of the sealing of the splice will now be discussed in reference to FIG. 5. After all of the electrical connections have been made and each of the end caps 40 are in place, the two camming brackets 60 are placed adjacent the first and second ends 18 and 20 of the sleeve 12 and are aligned with and slide over the outer ends of flanges 50 and 52 to bias the flanges 50 and 52, together. This biasing action causes the slit in the sleeve to decrease, and the diameter of the sleeve to decrease, as each bracket 60 is drawn towards the center of the sleeve. In addition, as the sleeve diameter is decreased, the ridges 59 of the end caps are compressed against the inner surface of the sleeve and splay outwardly to permit reduction of the sleeve diameter to further retain the end caps within the sleeve.

It is preferable that the brackets 60 be comprised of a generally rigid material, such as a non-corrosive metal or plastic, which does not readily degrade when exposed to underground applications. The bracket 60 comprises an elongated planar plate 61 which is tapered from one end to the other. An opening 62 is provided centrally of the plate 61. At the wide end, an integral flange 64 is provided which extends upwardly from plate 61 and extends across the edge of the plate. A depending integral flange 66 is provided on each of the longitudinal edges of plate 61. The flanges 66 extend from the wide end of plate 61 to the narrower end. At the bottom of each of the flanges 66, the flanges are bent inwardly at 68 to form a tracking edge which prevents the brackets from coming off the flanges 50 and 52.

The flanges 50 and 52, as best seen in FIG. 2, each have a cross section that thickens or diverges from its narrowest point at the end of the sleeve 20, to its widest thickness at point 49 at the center of the sleeve, longitudinally. The flanges 50 and 52 also each have a camming flange 53 which is formed integrally at the top edge of each of the flanges on the outer wall 57 of flanges 50 and 52 spaced from the inner edges 24. The camming flanges 53 are parallel to the depending flanges 66 when the wedge brackets 60 are slid over the flanges 50 and 52. The camming flanges 53 also act in combination with the end portions 68 of depending flanges 66 to prevent the brackets 60 from escaping radially from the flanges of the sleeve as the brackets 60 are drawn together longitudinally along the flanges 50 and 52. The flanges 66 of bracket 60, thus engage the upper flange 53 extending from the longitudinally angled sidewall 57 associated with each of the flanges 50 and 52. The vertical flange 69 of each bracket has a hole 64 therethrough for securement of the brackets 60 together with a suitable threaded fastener. The flanges 66 of each wedge 60 engage both longitudinally extending edges of the upper flange 53 (FIG. 1) during the camming action. As shown in FIGS. 1 and 5, each of the angled sidewalls 57 is generally triangular in shape, with the apex of each triangle being located at the center 49 of the sleeve, adjacent the point that the two brackets 60 are secured together.

When one wishes to fill the sleeve with encapsulant, the flanges 50 and 52 are manually drawn together to enable the wide end of the bracket 60 to be placed over the end and thereabout. Each of the holes 60 in each wedge are then aligned over one of the holes 32 located adjacent the first and second ends of the sleeve. The desired amount of a conventional liquid encapsulant is then poured through aligned holes 62 and 32 to fill the sleeve. When the desired amount of encapsulant is inserted and the user has permitted the air to escape as desired, the brackets 60 are pushed together, thereby camming the flanges 50 and 52 together. The brackets are then drawn closer together and then secured by the nut 70 and bolt 72 extending through holes 64. The closing of the longitudinal slit 22 of the sleeve 12, causes the diameter of the sleeve to be decreased and reduces the volume of the sleeve. This causes the internally created pressure to force the encapsulant up through the sheathing of the spliced wiring and causes the encapsulant to protect the splice from the entry of water and other contaminants. Excess encapsulant also escapes from opening 32 in the center of flange 30, until it is covered completely by the closing of the slit as the flanges 50 and 52 are brought closer to one another.

Although almost any conventional approved encapsulant suitable for the intended purposes may be utilized, it is preferable that the conventional two-part urethane composition encapsulant sold under the trade name CASCHEM 126 be utilized. When mixed, this encapsulant is readily pourable and sets to a firm, gelatin-like consistency, which enables the user to subsequently re-enter the splice for repairs, if necessary. Although a hard-setting encapsulant may be utilized, subsequent access to the splice after setting of the encapsulant would be considerably more difficult.

In order to detect whether the proper amount of internal sleeve pressure has been attained to sufficiently seal the splice, the pressure dome 80 located on the end cap 40 is inspected visually. In the preferred embodiment, the dome 80 will protrude to the convex position shown in FIG. 4, when the pressure inside the sleeve is in the range of 12-15 pounds per square inch (psi), although, depending upon the circumstances of use, the desired pressure range may be 10-20 psi.

The advantages of the present invention are numerous. For example, the apparatus permits external connections for bonding and grounding, permitting easy access for repair crews to utilize locating and test equipment. The apparatus is easy to use and is capable of withstanding the environmental conditions associated with underground applications. Other advantages include a visual indicator of the proper internal encapsulant pressure, which indicates at the time the apparatus is in place, that the splice is sealed by the encapsulant to deter the entry of moisture into the splice.

Without further elaboration the foregoing will so fully illustrate my invention that others may, by applying current or future knowledge, adapt the same for use under various conditions of service.

I claim:
1. An apparatus for sealing cable splices comprising:
   (a) a sleeve having an interior and exterior surface, a first end, a second end and a longitudinal slit having a longitudinal edge along both sides thereof and which is able to be separated and thereby alter the diameter of the sleeve;
   (b) a pair of locking flanges secured to the exterior surface which extend longitudinally adjacent each side of the longitudinal edge and which may be cammed together to close the longitudinal slit;
   (c) an inner flange located along one longitudinal edge of the longitudinal slit which extends peripherally and is adjacent the inner surface of the sleeve when the pair of locking flanges are releasably secured together;
   (d) an end cap located at each of the first and second ends of the sleeve, the end cap having at least one opening therein to permit the passage of a cable therethrough;

(e) means for releasably camming the locking flanges adjacent one another; and (f) means for indicating the internal pressure in the sleeve when an encapsulant is inserted therein, the means for indicating internal pressure being located on at least one of the end caps, the means for indicating the internal pressure in the sleeve comprising a dome which is generally concave to the exterior surface of the end cap when the pressure in the interior of the sleeve is at a first internal pressure and is generally convex to the exterior to the surface of the end cap when the pressure in the interior of the sleeve is at a second internal pressure.

2. The apparatus of claim 1 wherein the inner flange has at least one opening therethrough.

3. The apparatus of claim 1 wherein the sleeve is generally cylindrical in shape.

4. The apparatus of claim 1 wherein the means for releasably camming the locking flanges adjacent one another comprises a pair of clamps each of which generally correspond in shape to a portion of the pair of locking flanges when the locking flanges are adjacent one another, wherein when the pair of clamps slidably engage the pair of locking flanges, the pair of clamps cam the locking flanges adjacent one another.

5. The apparatus of claim 4 wherein each of the pair of clamps are generally rhomboidal in shape and additionally comprise a flange for engaging the pair of locking flanges when the locking flanges are adjacent one another.

6. The apparatus of claim 5 wherein each of the locking flanges are generally triangular in shape and wherein one of the sides of the generally triangular shape is located along each of the longitudinal edges of the sleeve.

7. The apparatus of claim 1 wherein each of the end caps has a plurality of openings therein to permit the passage of cables therethrough.

8. The apparatus of claim 1 wherein each of the end caps additionally comprises an interior and exterior surface and a plurality of sealed tapered ports having a tapered projection extending from the exterior to the interior of each of the end caps which may be severed to permit the passage of a cable therethrough.

9. The apparatus of claim 8 wherein a means for sealing is located adjacent the interior surface of each of the end caps about each of the at least one openings in each of the end caps through which a cable may pass therethrough.

10. The apparatus of claim 1 wherein each of the end caps additionally comprises a circumferential edge having a plurality of grooves thereabout to engage the interior surface of the sleeve.

11. The apparatus of claim 1 additionally comprising an encapsulant inserted into the interior of the sleeve to seal the splice containing therein.

12. The apparatus of claim 11 wherein the encapsulant comprises a urethane composition.

* * * * *